(12) United States Patent
Chen

(10) Patent No.: US 9,001,432 B2
(45) Date of Patent: Apr. 7, 2015

(54) ZOOM LENS

(71) Applicants: Sintai Optical (Shenzhen) Co., Ltd., Shenzhen, Guandong Province (CN); Asia Optical International Ltd., Tortola (GB)

(72) Inventor: Ming-Chung Chen, Taichung (TW)

(73) Assignees: Sintai Optical (Shenzhen) Co., Ltd., Shenzhen, Guandong Province (CN); Asia Optical International Ltd., Tortola (VG)

( * ) Notice: Subject to any disclaimer, the term of this patent is extended or adjusted under 35 U.S.C. 154(b) by 0 days.

(21) Appl. No.: 14/144,653

(22) Filed: Dec. 31, 2013

(65) Prior Publication Data

US 2014/0204470 A1    Jul. 24, 2014

(30) Foreign Application Priority Data

Jan. 23, 2013   (TW) .............................. 102102426 A

(51) Int. Cl.
*G02B 15/14*    (2006.01)
*G02B 15/173*   (2006.01)

(52) U.S. Cl.
CPC .................................. *G02B 15/173* (2013.01)

(58) Field of Classification Search
USPC ......................................................... 359/687
See application file for complete search history.

(56) References Cited

U.S. PATENT DOCUMENTS

2013/0050844 A1*   2/2013   Li ................................ 359/687

* cited by examiner

*Primary Examiner* — James Jones
(74) *Attorney, Agent, or Firm* — McClure, Qualey & Rodack, LLP

(57) ABSTRACT

A zoom lens includes a first lens group, a second lens group, a third lens group and a fourth lens group, all of which are arranged in sequence from an object side to an image side along an optical axis. The first lens group is with positive refractive power. The second lens group is with negative refractive power. The third lens group is with positive refractive power. The fourth lens group is with positive refractive power. The first lens group includes a first lens and a second lens, both of which are arranged in sequence from the object side to the image side along the optical axis, wherein the first lens group and the first lens satisfy the following condition: $-1.2 < f_{G1}/f_1 < -0.58$, wherein $f_{G1}$ is an effective focal length of the first lens group and $f_1$ is an effective focal length of the first lens.

10 Claims, 24 Drawing Sheets

ZOOM LENS

BACKGROUND OF THE INVENTION

1. Field of the Invention

The invention relates to a lens, and more particularly to a zoom lens.

2. Description of the Related Art

A consumer digital still camera is almost equipped with a zoom lens, the zoom ratio of which has been developed from 2, 3, and 5 times in early stages, through 10 and 12 times, to more than 20 times recently. A zoom lens differs from a fixed focal length lens in that the focal length of a zoom lens is adjustable within a certain range. When a zoom lens zooms to a telephoto end, the distant object looks closer and magnified. When a zoom lens zooms to a wide-angle end, the field of view is expanded to accommodate a wider range of image. The fixed focal length lens doesn't have zoom in and zoom out function as the zoom lens has.

The zoom lens is developed toward high zoom ratio as a variety of applications are required by users. Furthermore, the requirement of image quality is also rising. However, it is not easy to achieve that a zoom lens of a high zoom ratio has a good optical performance.

BRIEF SUMMARY OF THE INVENTION

The invention provides a zoom lens to solve the above problems. The zoom lens has a high zoom ratio and still has a good optical performance.

The zoom lens in accordance with an exemplary embodiment of the invention includes a first lens group, a second lens group, a third lens group and a fourth lens group, all of which are arranged in sequence from an object side to an image side along an optical axis. The first lens group is with positive refractive power. The second lens group is with negative refractive power. The third lens group is with positive refractive power. The fourth lens group is with positive refractive power. An interval between the first lens group and the second lens group is changeable, an interval between the second lens group and the third lens group is changeable and an interval between the third lens group and the fourth lens group is changeable when the zoom lens zooms from wide-angle end to telephoto end. The first lens group includes a first lens and a second lens, both of which are arranged in sequence from the object side to the image side along the optical axis, wherein the first lens group and the first lens satisfy the following condition: $-1.2 < f_{G1}/f_1 < -0.58$, wherein $f_{G1}$ is an effective focal length of the first lens group and $f_1$ is an effective focal length of the first lens.

In another exemplary embodiment, an Abbe number of the first lens is greater than 35.

In yet another exemplary embodiment, the first lens is with negative refractive power.

In another exemplary embodiment, an Abbe number of the second lens is greater than 80.

In yet another exemplary embodiment, the second lens is with positive refractive power.

In another exemplary embodiment, the first lens group further includes a third lens, all of the first lens, the second lens and the third lens are arranged in sequence from the object side to the image side along the optical axis and an Abbe number of the third lens is greater than 80.

In yet another exemplary embodiment, the third lens is with positive refractive power.

In another exemplary embodiment, the first lens group further includes a fourth lens, all of the first lens, the second lens, the third lens and the fourth lens are arranged in sequence from the object side to the image side along the optical axis and an Abbe number of the fourth lens is greater than 80.

In yet another exemplary embodiment, the fourth lens is with positive refractive power.

In another exemplary embodiment, the zoom lens further includes a stop disposed between the second lens group and the third lens group.

A detailed description is given in the following embodiment with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
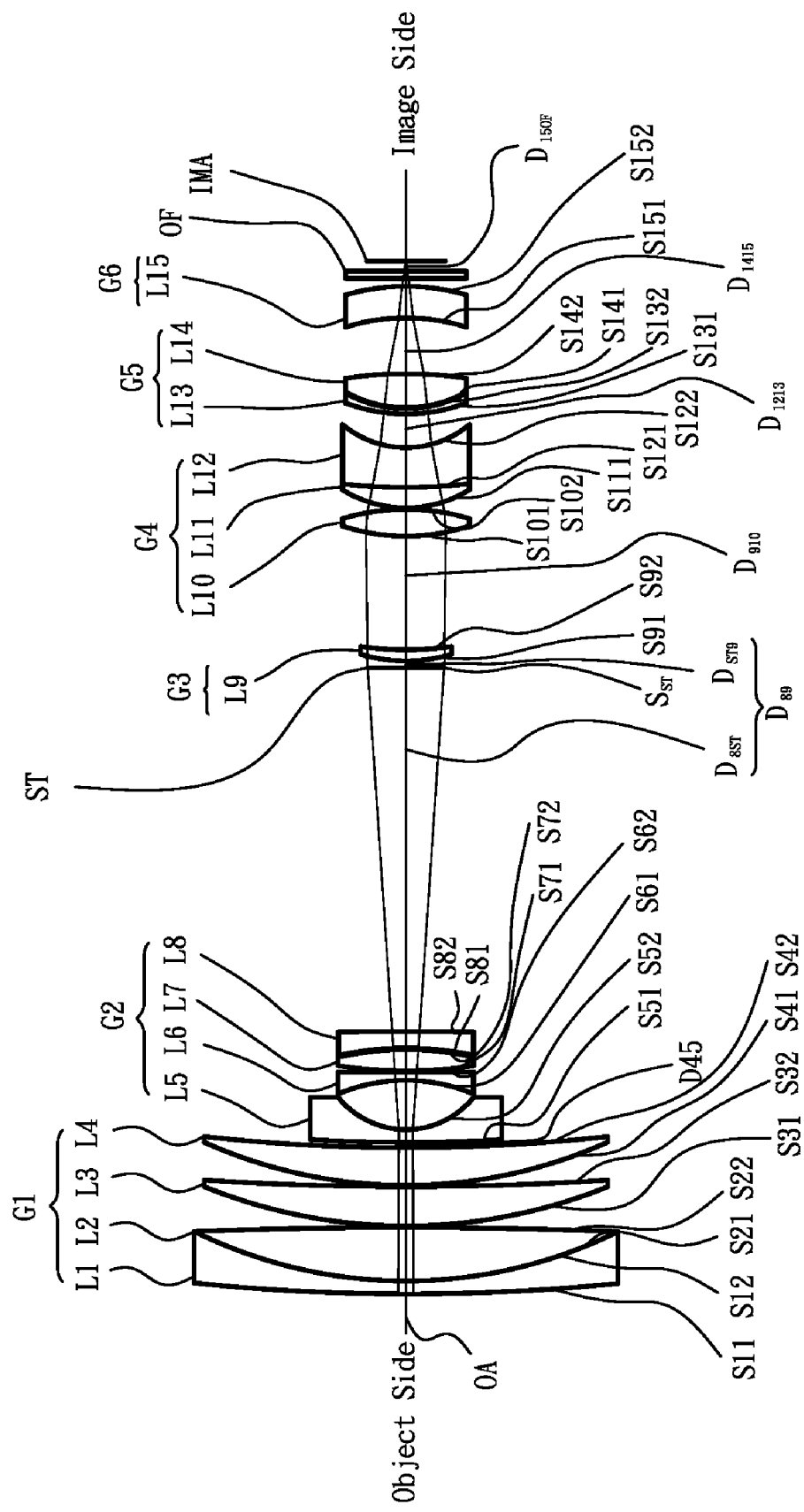
FIG. 1 is a lens layout and optical path diagram of a zoom lens at wide-angle end in accordance with an embodiment of the invention.
Figure 2:
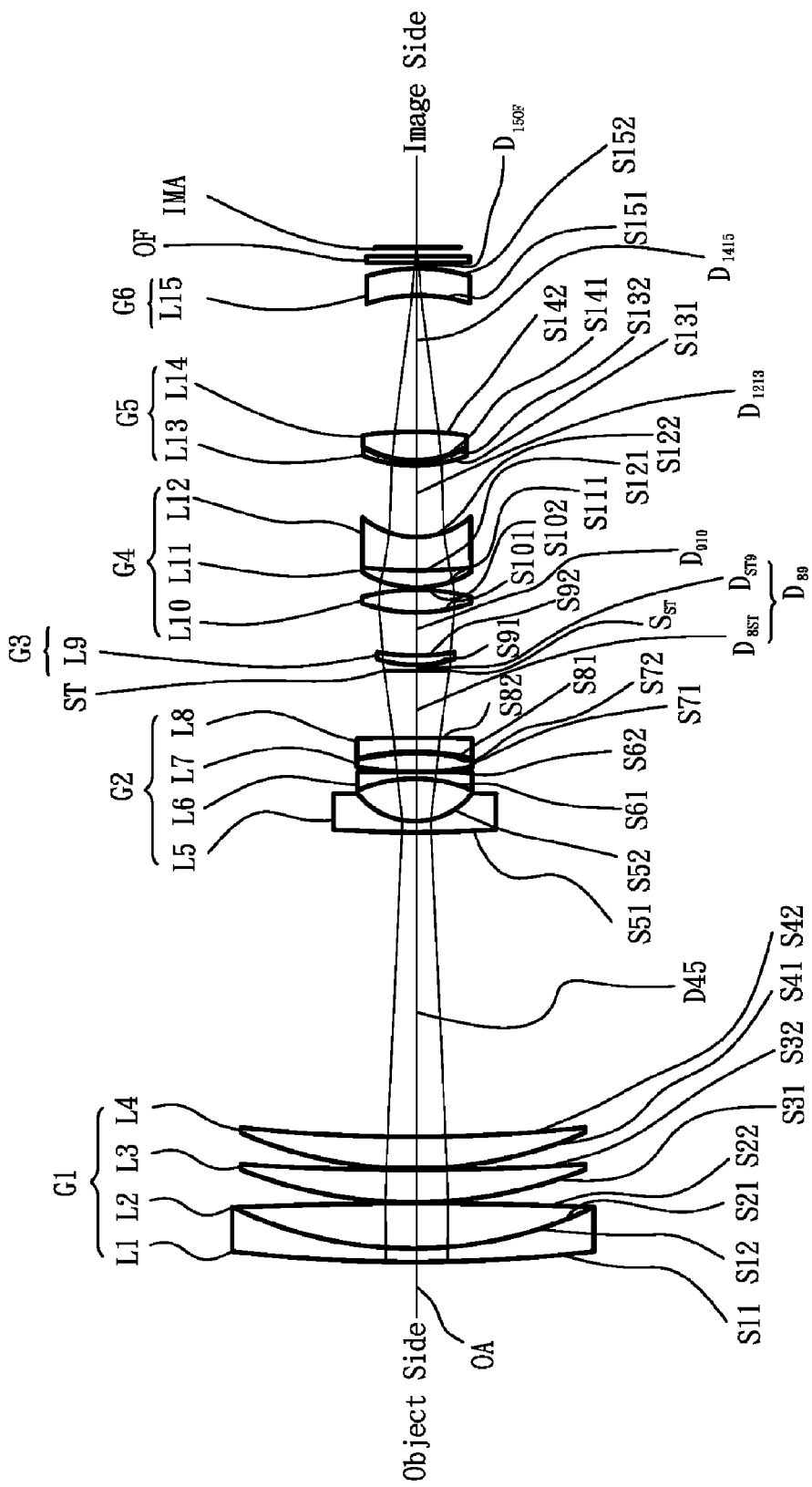
FIG. 2 is a lens layout and optical path diagram of a zoom lens at medium end in accordance with an embodiment of the invention.
Figure 3:
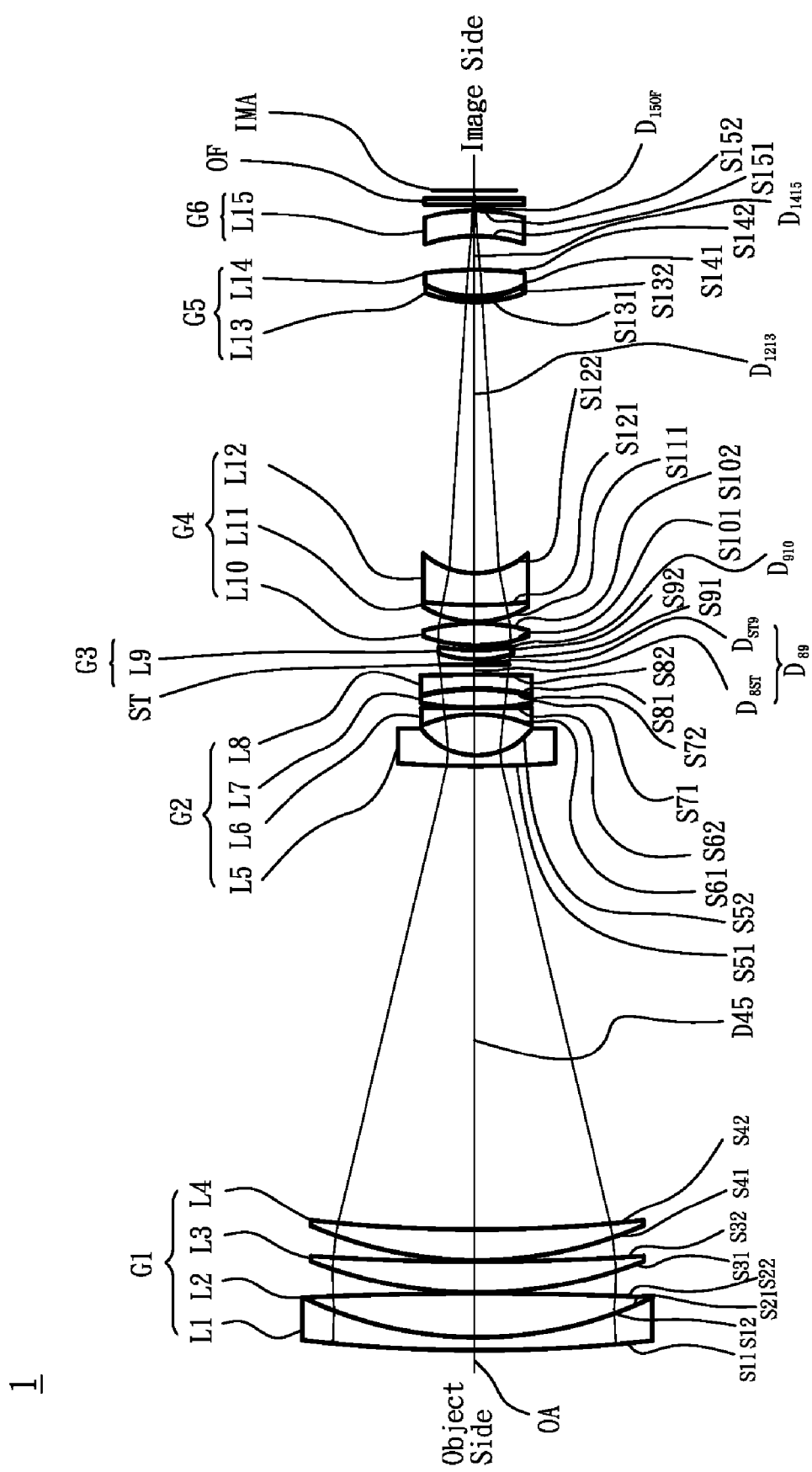
FIG. 3 is a lens layout and optical path diagram of a zoom lens at telephoto end in accordance with an embodiment of the invention.

Referring to FIG. 1, FIG. 2 and FIG. 3, FIG. 1 is a lens layout and optical path diagram of a zoom lens at wide-angle end in accordance with an embodiment of the invention, FIG. 2 is a lens layout and optical path diagram of a zoom lens at medium end in accordance with an embodiment of the invention and FIG. 3 is a lens layout and optical path diagram of a zoom lens at telephoto end in accordance with an embodiment of the invention. The zoom lens 1 includes a first lens group G1, a second lens group G2, a stop ST, a third lens group G3, a fourth lens group G4, a fifth lens group G5, a sixth lens group G6 and an optical filter OF, all of which are arranged in sequence from an object side to an image side along an optical axis OA. An effective focal length of the zoom lens 1 is adjustable by means of changing intervals $D_{45}$, $D_{89}$, $D_{910}$, $D_{1213}$, $D_{1415}$ of the lens groups when the zoom lens 1 is in use. The above interval variations arising from the zooming of the zoom lens 1 can be seen obviously from FIG. 1, FIG. 2 and FIG. 3. The displacements of each lens group become smaller and the time of zooming is shortened because all of the lens groups of the zoom lens 1 are movable along the optical axis OA.

In the present embodiment, the first lens group G1 is with positive refractive power, the second lens group G2 is with negative refractive power, the third lens group G3 is with positive refractive power, the fourth lens group G4 is with positive refractive power, the fifth lens group G5 is with positive refractive power and the sixth lens group G6 is with negative refractive power.

The first lens group G1 includes a first lens L1, a second lens L2, a third lens L3 and a fourth lens L4, all of which are arranged in sequence from the object side to the image side along the optical axis OA. The first lens L1 is with negative refractive power. The second lens L2 is with positive refractive power. The third lens L3 is with positive refractive power. The fourth lens L4 is with positive refractive power. The image side surface S12 of the first lens L1 and the object side surface S21 of the second lens L2 are cemented.

The second lens group G2 includes a fifth lens L5, a sixth lens L6, a seventh lens L7 and an eighth lens L8, all of which are arranged in sequence from the object side to the image side along the optical axis OA.

The third lens group G3 includes a ninth lens L9.

The fourth lens group G4 includes a tenth lens L10, an eleventh lens L11 and a twelfth lens L12, all of which are arranged in sequence from the object side to the image side along the optical axis OA. The image side surface 5121 of the eleventh lens L11 and the object side surface 5121 of the twelfth lens L12 are cemented.

The fifth lens group G5 includes a thirteenth lens L13 and a fourteenth lens L14, both of which are arranged in sequence from the object side to the image side along the optical axis OA.

The sixth lens group G6 includes a fifteenth lens L15.

An interval $D_{ST9}$ between the stop ST and the third lens group G3 is stationary. The optical filter OF is a plate glass and includes an object side surface and an image side surface. Both of the object side surface and the image side surface are plane surfaces.

In order to maintain excellent optical performance of the zoom lens 1 in accordance with an embodiment, the zoom lens 1 must satisfies the following five conditions:

$$Vd_1 > 35 \tag{1}$$

$$-1.2 < f_{G1}/f_1 < -0.58 \tag{2}$$

$$Vd_2 > 80 \tag{3}$$

$$Vd_3 > 80 \tag{4}$$

$$Vd_4 > 80 \tag{5}$$

wherein $Vd_1$ is the Abbe number of the first lens L1, $f_{G1}$ is the effective focal length of the first lens group G1, $f_1$ is the effective focal length of the first lens L1, $Vd_2$ is the Abbe number of the second lens L2, $Vd_3$ is the Abbe number of the third lens L3, $Vd_4$ is the Abbe number of the fourth lens L4.

Due to the above design of the lenses and stop ST, the zoom lens 1 at a high zoom ratio is provided with a good optical performance.

In order to achieve the above purpose and effectively enhance the optical performance, the zoom lens 1 at the wide-angle end, medium end and telephoto end of the present embodiment of the invention is provided with the optical specifications shown in Table 1, which include the effective focal length, radius of curvature of each lens surface, interval between adjacent surface, refractive index of each lens and Abbe number of each lens. Table 1 shows that the effective focal length of the zoom lens 1 at the wide-angle end is equal to 4.40 mm, the effective focal length of the zoom lens 1 at the medium end is equal to 28.96 mm, the effective focal length of the zoom lens 1 at the telephoto end is equal to 190.63 mm, and the zoom ratio of the zoom lens 1 is about 43.32.

TABLE 1

W(Wide-angle End) Effective Focal Length = 4.40 mm
M(Medium End) Effective Focal Length = 28.96 mm
T(Telephoto End) Effective Focal Length = 190.63 mm

| Surface Number | Radius of (mm) | Thickness (mm) | Nd | Vd | Remark |
|---|---|---|---|---|---|
| S11 | 201.10 | 1.50 | 1.834807 | 42.71 | The First Lens Group G1 The First Lens L1 |
| S12 | 49.50 | 0.00 | | | |
| S21 | 49.50 | 5.10 | 1.496999 | 81.55 | The First Lens Group G1 The Second Lens L2 |
| S22 | −621.53 | 0.13 | | | |
| S31 | 53.63 | 3.87 | 1.496999 | 81.55 | The First Lens Group G1 The Third Lens L3 |
| S32 | 311.67 | 0.12 | | | |
| S41 | 48.34 | 3.72 | 1.496999 | 81.55 | The First Lens Group G1 The Fourth Lens L4 |
| S42 | 182.49 | 0.49(W) 35.29(M) 55.82(T) | | | Interval $D_{45}$ |
| S51 | 3765.80 | 1.29 | 1.848970 | 40.39 | The Second Lens Group G2 The Fifth Lens L5 |
| S52 | 8.65 | 4.86 | | | |
| S61 | −17.43 | 0.80 | 1.882997 | 40.77 | The Second Lens Group G2 The Sixth Lens L6 |
| S62 | 1256.77 | 0.11 | | | |
| S71 | 43.49 | 2.15 | 1.922860 | 18.90 | The Second Lens Group G2 The Seventh Lens L7 |
| S72 | −29.50 | 0.11 | | | |
| S81 | −31.57 | 1.63 | 1.534611 | 56.07 | The Second Lens Group G2 The Eighth Lens L8 |
| S82 | −566.59 | 36.01(W) 7.70(M) 1.30(T) | | | Interval $D_{8ST}$ |
| $S_{ST}$ | ∞ | 0.7 | | | Stop ST |
| S91 | 16.00 | 1.08 | 1.534611 | 56.07 | The Third Lens Group G3 The Ninth Lens L9 |
| S92 | 29.91 | 11.25(W) 5.03(M) 0.60(T) | | | Interval $D_{910}$ |
| S101 | 17.64 | 2.65 | 1.484100 | 70.24 | The Fourth Lens Group G4 The Tenth Lens L10 |
| S102 | −23.16 | 0.13 | | | |
| S111 | 11.93 | 2.04 | 1.496999 | 81.55 | The Fourth Lens Group G4 The Eleventh Lens L11 |
| S121 | 59.03 | 3.87 | 1.903621 | 31.32 | The Fourth Lens Group G4 The Twelfth Lens L12 |
| S122 | 9.6 | 3.38(W) 8.33(M) 32.59(T) | | | Interval $D_{1213}$ |
| S131 | 17.00 | 0.50 | 1.846660 | 23.78 | The Fifth Lens Group G5 The Thirteenth Lens L13 |
| S132 | 12.09 | 0.13 | | | |
| S141 | 12.53 | 3.33 | 1.534611 | 56.07 | The Fifth Lens Group G5 The Fourteenth Lens L14 |
| S142 | −40.52 | 5.54(W) 15.67(M) 3.99(T) | | | Interval $D_{1415}$ |
| S151 | −17.48 | 3.08 | 1.534611 | 56.07 | The Sixth Lens Group G6 The Fifteenth Lens L15 |
| S152 | −19.78 | 0.78 | | | Interval $D_{15OF}$ |

The aspheric surface sag z of each lens in table 1 can be calculated by the following formula:

$$z = ch^2/\{1+[1-(k+1)c^2h^2]^{1/2}\} \pm Ah^4 + Bh^6 + Ch^8 + Dh^{10} + Eh^{12} + Fh^{14}$$

where c is curvature, h is the vertical distance from the lens surface to the optical axis, k is conic constant and A, B, C, D, E and F are aspheric coefficients.

In the present embodiment, the conic constant k and the aspheric coefficients A, B, C, D, E, F of each surface are shown in Table 2.

TABLE 2

| Surface Number | k | A | B | C | D | E | F |
|---|---|---|---|---|---|---|---|
| S51 | −48.27487463 | 1.9530E−05 | 3.4906E−06 | −9.6366E−08 | 1.1170E−09 | −6.4E−12 | 1.55E−14 |
| S52 | −1.773176541 | 2.9018E−04 | 3.7556E−06 | 1.7189E−07 | −6.7766E−09 | 4.82E−11 | 1.21E−13 |
| S81 | 0 | −6.7333E−06 | −8.5761E−07 | 1.5083E−07 | −6.8310E−09 | 1.24E−10 | −8.2E−13 |
| S91 | 0 | −2.5431E−05 | −4.6845E−07 | −2.0688E−08 | 2.3780E−09 | −5.5E−11 | 8.82E−14 |
| S101 | 0 | −5.5698E−05 | −7.4908E−07 | −9.3617E−09 | 3.3263E−09 | −9E−11 | 1.92E−13 |
| S102 | 0 | 2.7759E−05 | −1.7472E−07 | 3.9562E−08 | 2.3829E−09 | −9E−11 | 3.41E−13 |
| S141 | 0 | −1.11453E−05 | 6.43355E−07 | −1.089E−08 | −7.65706E−10 | 3.96E−11 | −5.2E−13 |
| S151 | 0 | 1.52656E−05 | 1.28619E−05 | −1.996E−07 | −2.97616E−09 | 6.54E−13 | 0 |
| S152 | 0 | −7.34435E−05 | 3.61433E−05 | −1.159E−06 | 2.31451E−08 | −4.4E−10 | 0 |

For the zoom lens 1 of the present embodiment, the Abbe number $Vd_1$ of the first lens L1 is equal to 42.71, the effective focal length $f_{G1}$ of the first lens group G1 is equal to 74.29 mm, the effective focal length $f_1$ of the first lens L1 is equal to −79.01 mm, the Abbe number $Vd_2$ of the second lens L2 is equal to 81.55, the Abbe number $Vd_3$ of the third lens L3 is equal to 81.55, and the Abbe number $Vd_4$ of the fourth lens L4 is equal to 81.55. According to the above data, the following value can be obtained:

$$f_{G1}/f_1 = -0.940.$$

It is found that the above data and the obtained value satisfy the conditions (1)-(5).

Figure 4A:
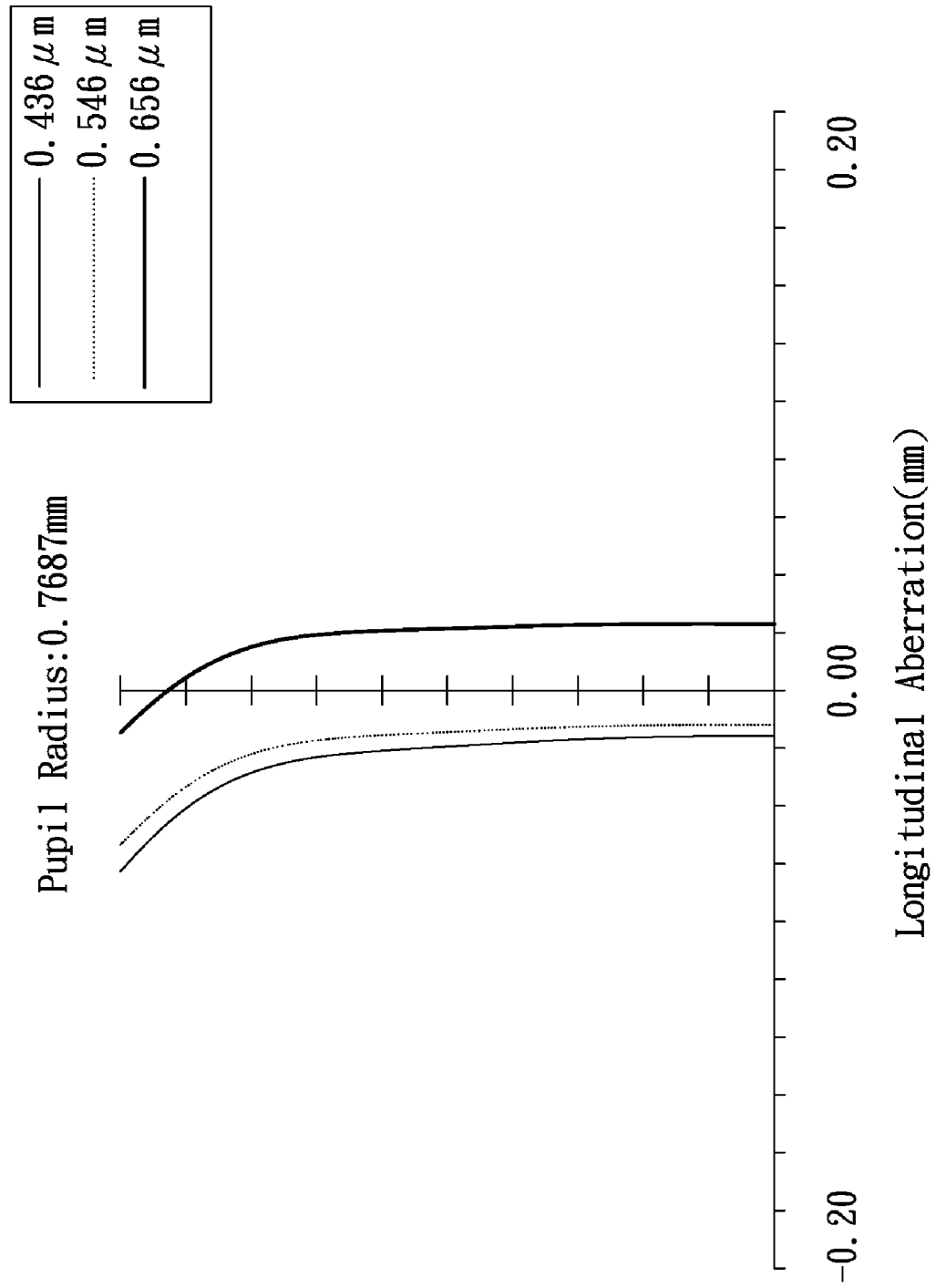
FIG. 4A is a longitudinal aberration diagram of a zoom lens at wide-angle end in accordance with an embodiment of the invention.
Figure 4B:
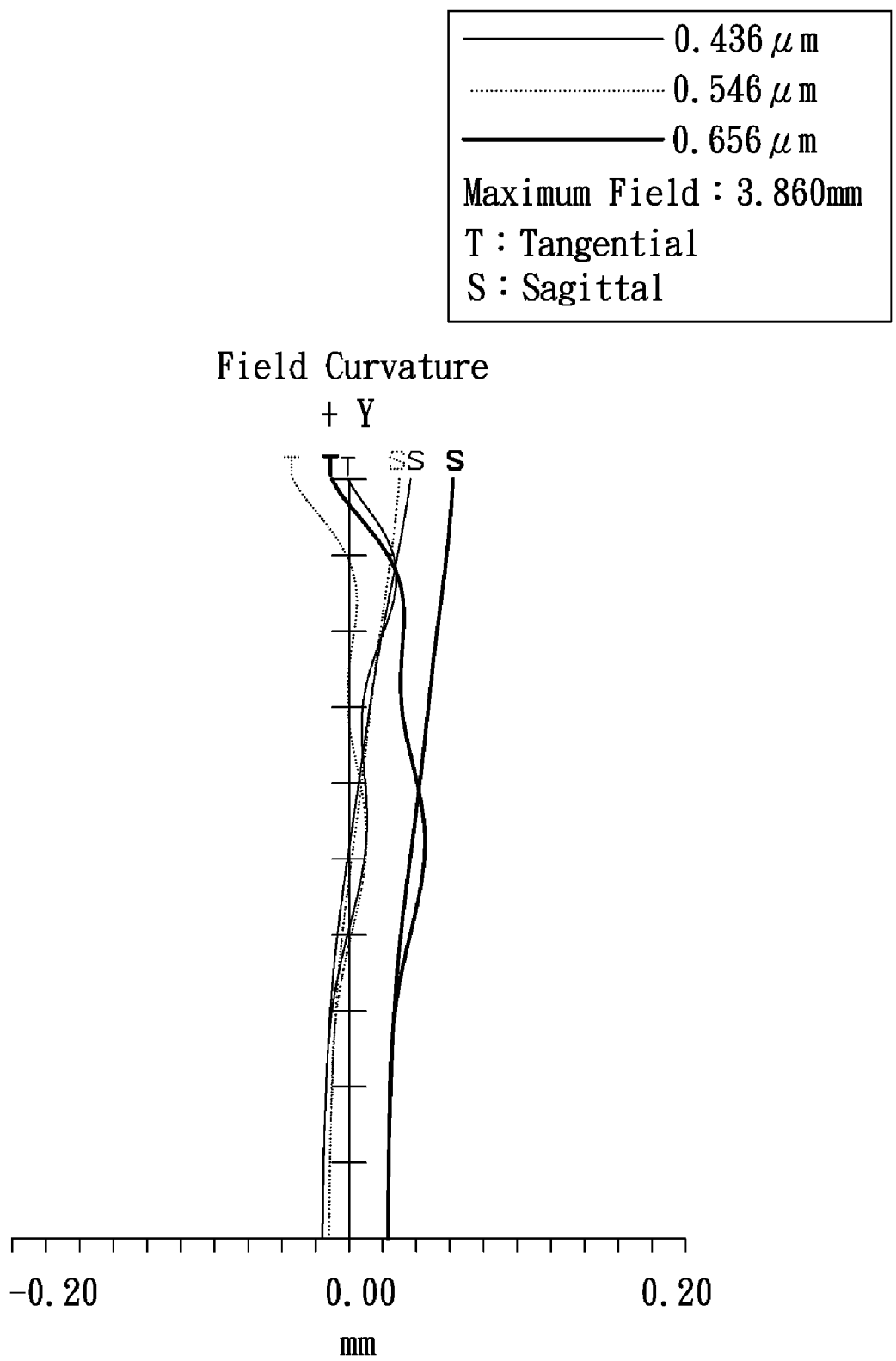
FIG. 4B is a field curvature diagram of a zoom lens at wide-angle end in accordance with an embodiment of the invention.
Figure 4C:
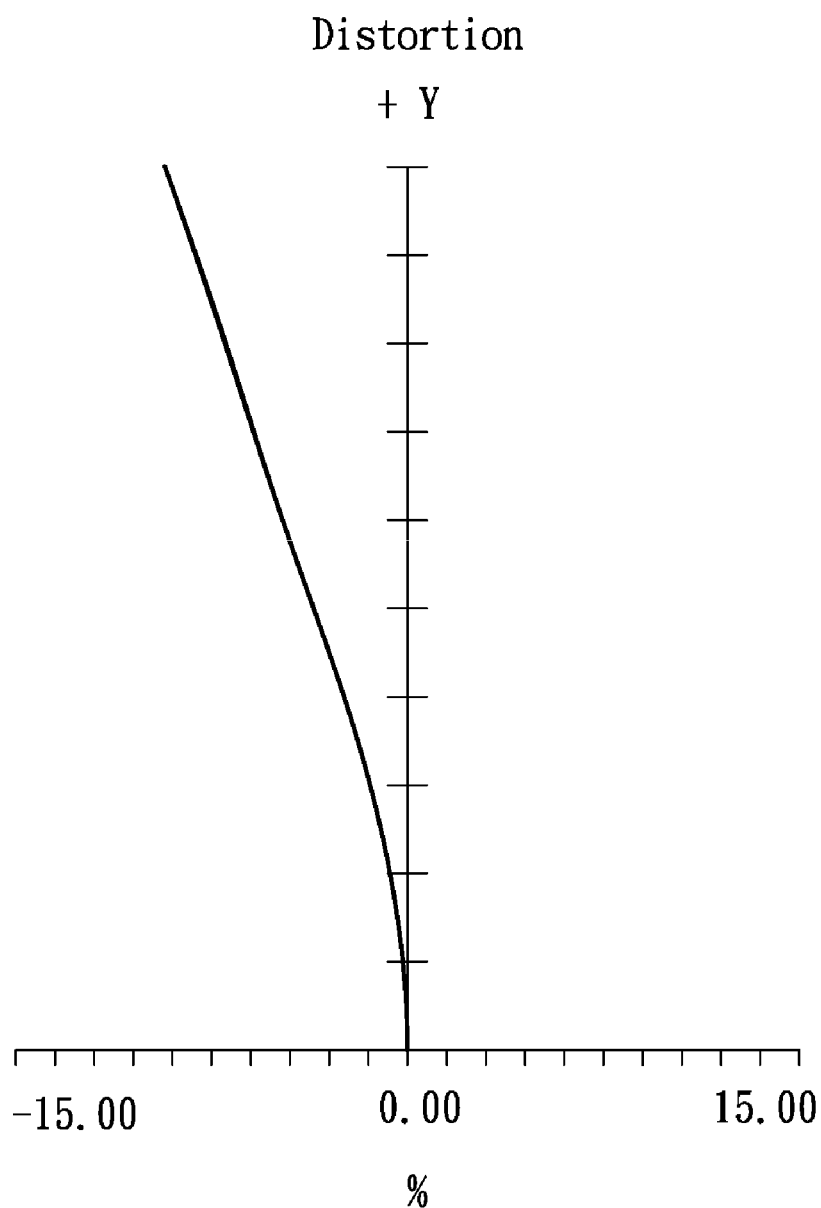
FIG. 4C is a distortion diagram of a zoom lens at wide-angle end in accordance with an embodiment of the invention.
Figure 4D:
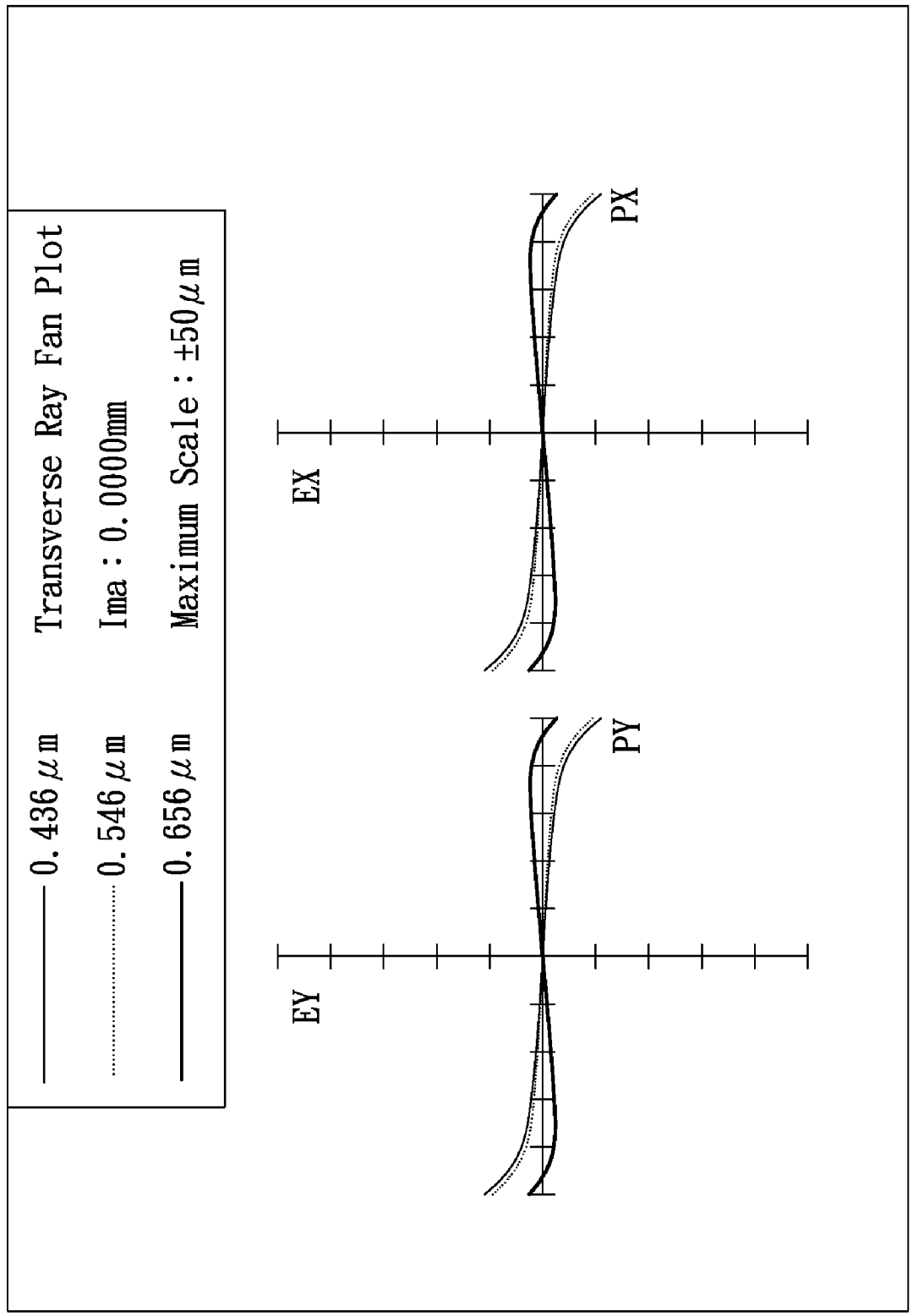
FIG. 4D is a transverse ray fan diagram of a zoom lens at wide-angle end in accordance with an embodiment of the invention.
Figure 4E:
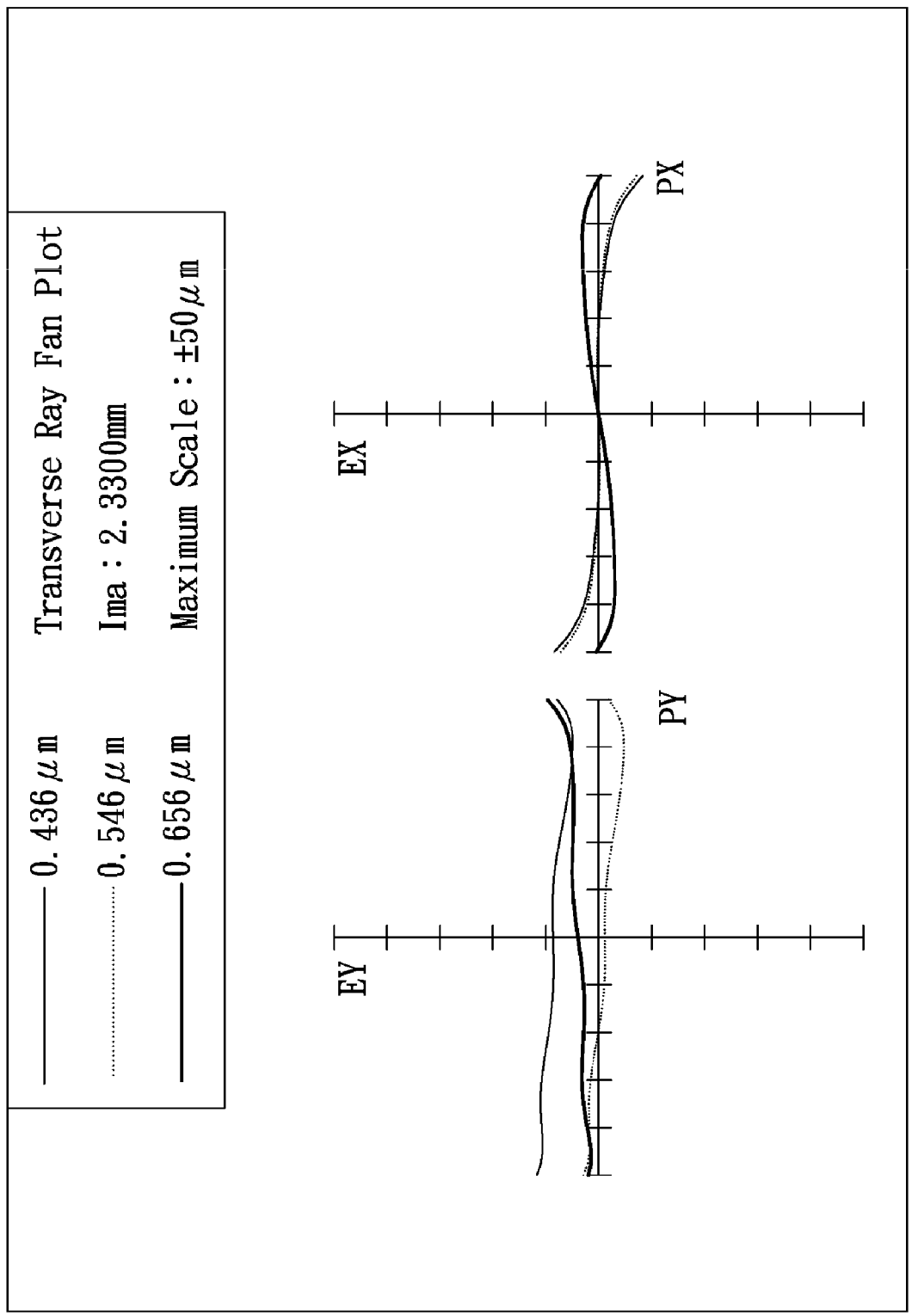
FIG. 4E is a transverse ray fan diagram of a zoom lens at wide-angle end in accordance with an embodiment of the invention.
Figure 4F:
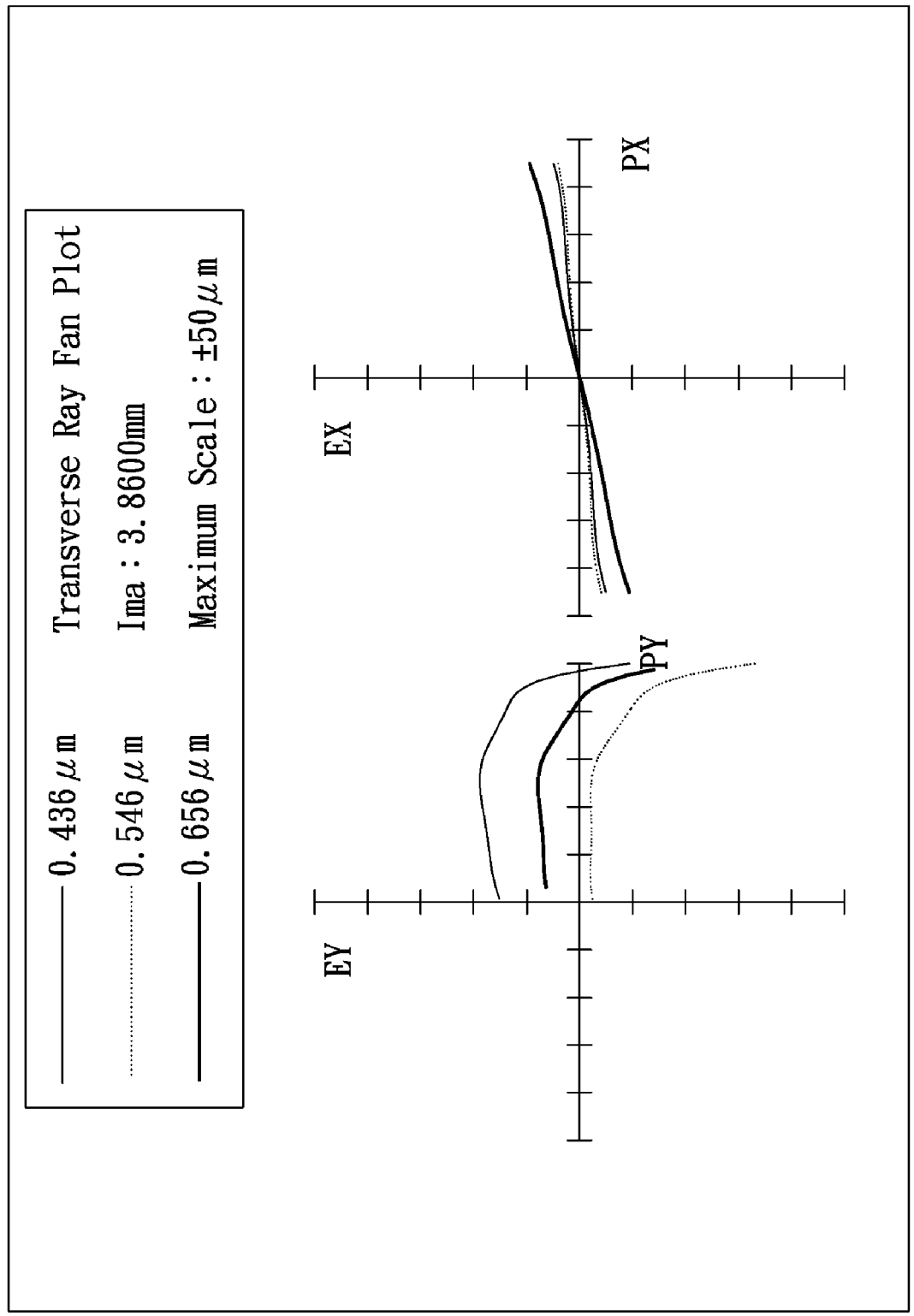
FIG. 4F is a transverse ray fan diagram of a zoom lens at wide-angle end in accordance with an embodiment of the invention.
Figure 4G:
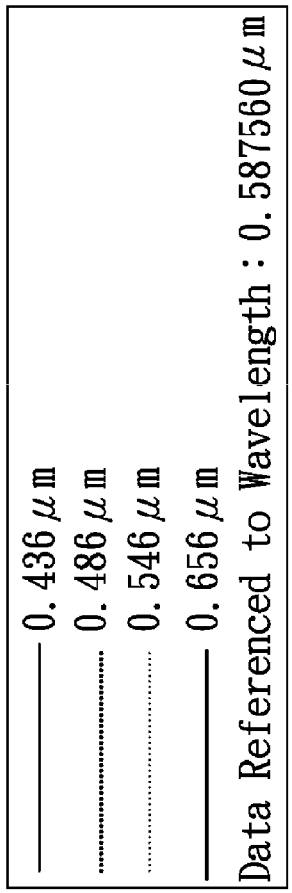
FIG. 4G is a lateral color diagram of a zoom lens at wide-angle end in accordance with an embodiment of the invention.
Figure 4G:
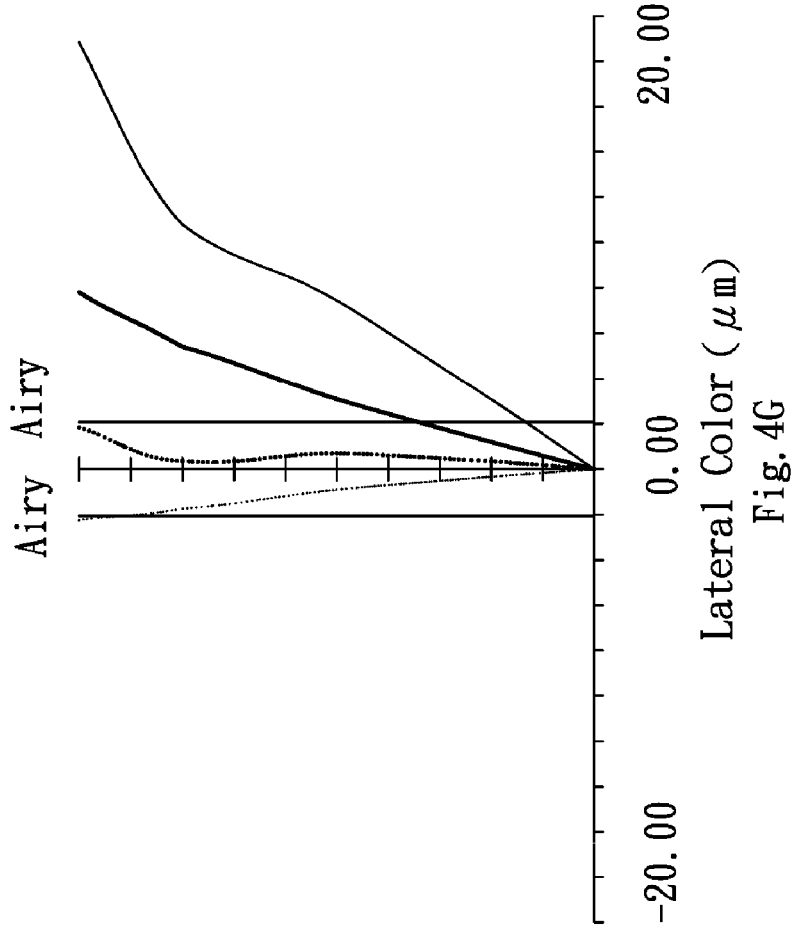
Figure 5A:
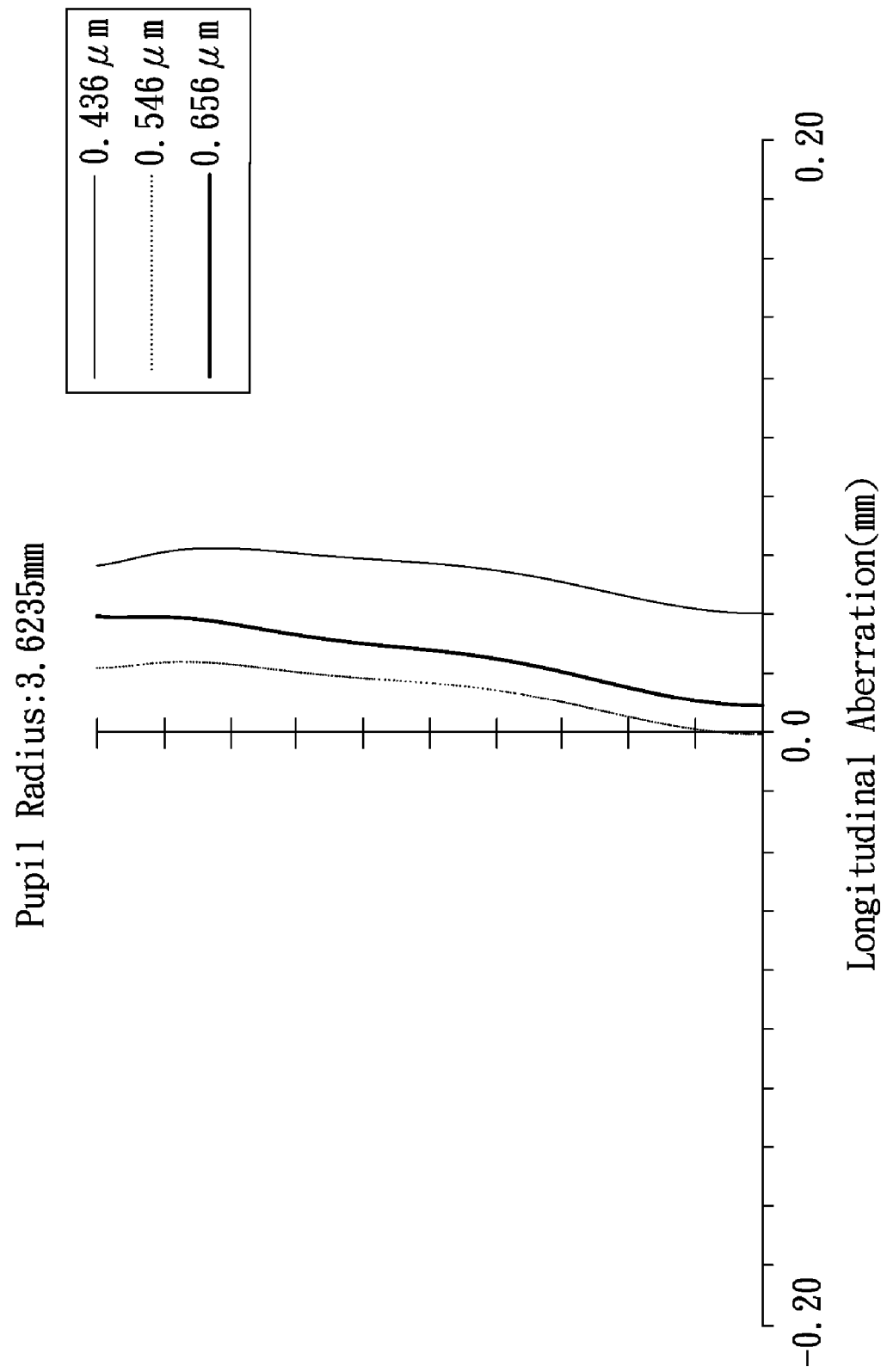
FIG. 5A is a longitudinal aberration diagram of a zoom lens at medium end in accordance with an embodiment of the invention.
Figure 5B:
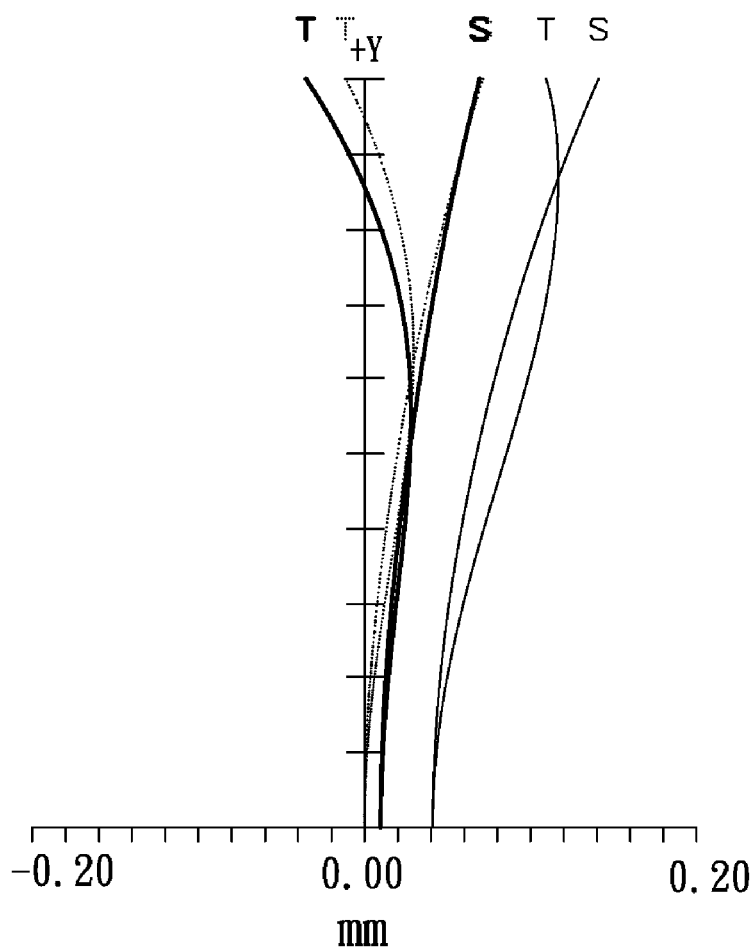
FIG. 5B is a field curvature diagram of a zoom lens at medium end in accordance with an embodiment of the invention.
Figure 5C:
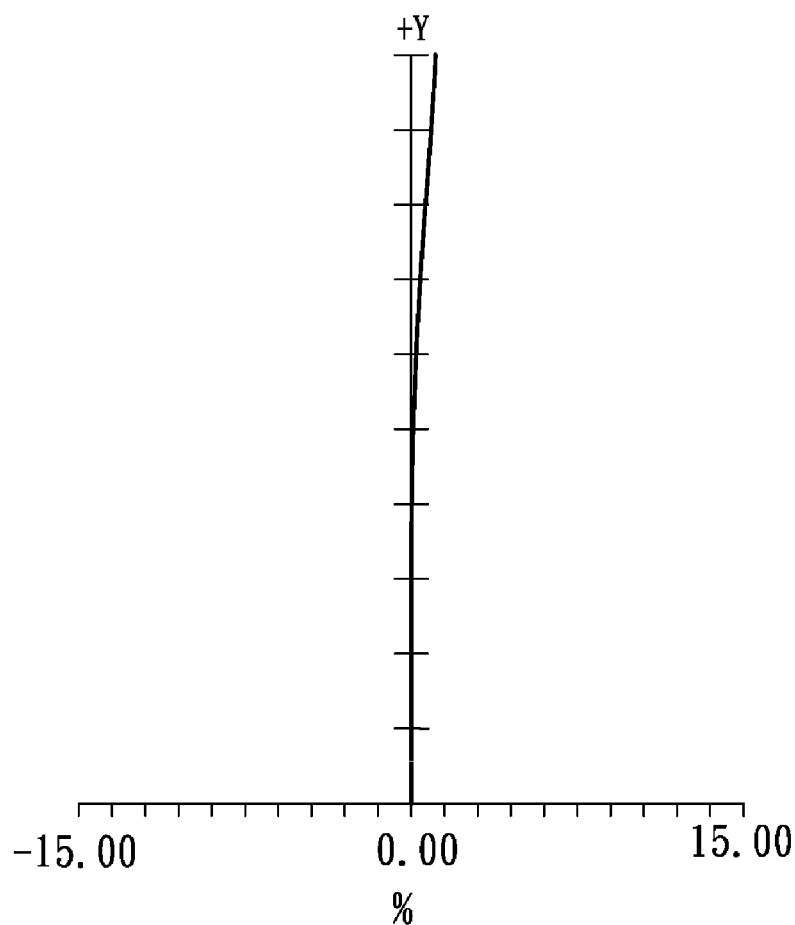
FIG. 5C is a distortion diagram of a zoom lens at medium end in accordance with an embodiment of the invention.
Figure 5D:
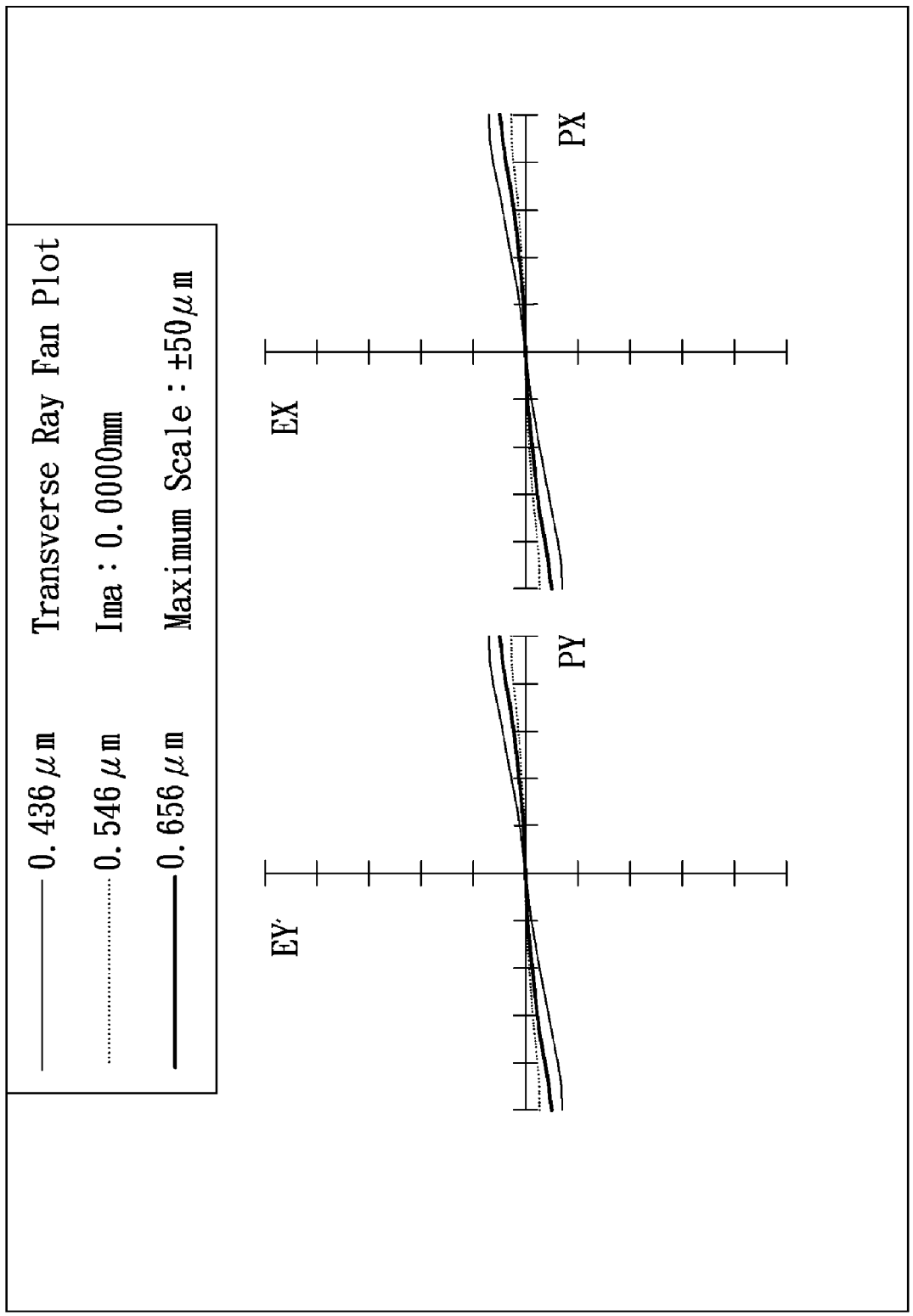
FIG. 5D is a transverse ray fan diagram of a zoom lens at medium end in accordance with an embodiment of the invention.
Figure 5E:
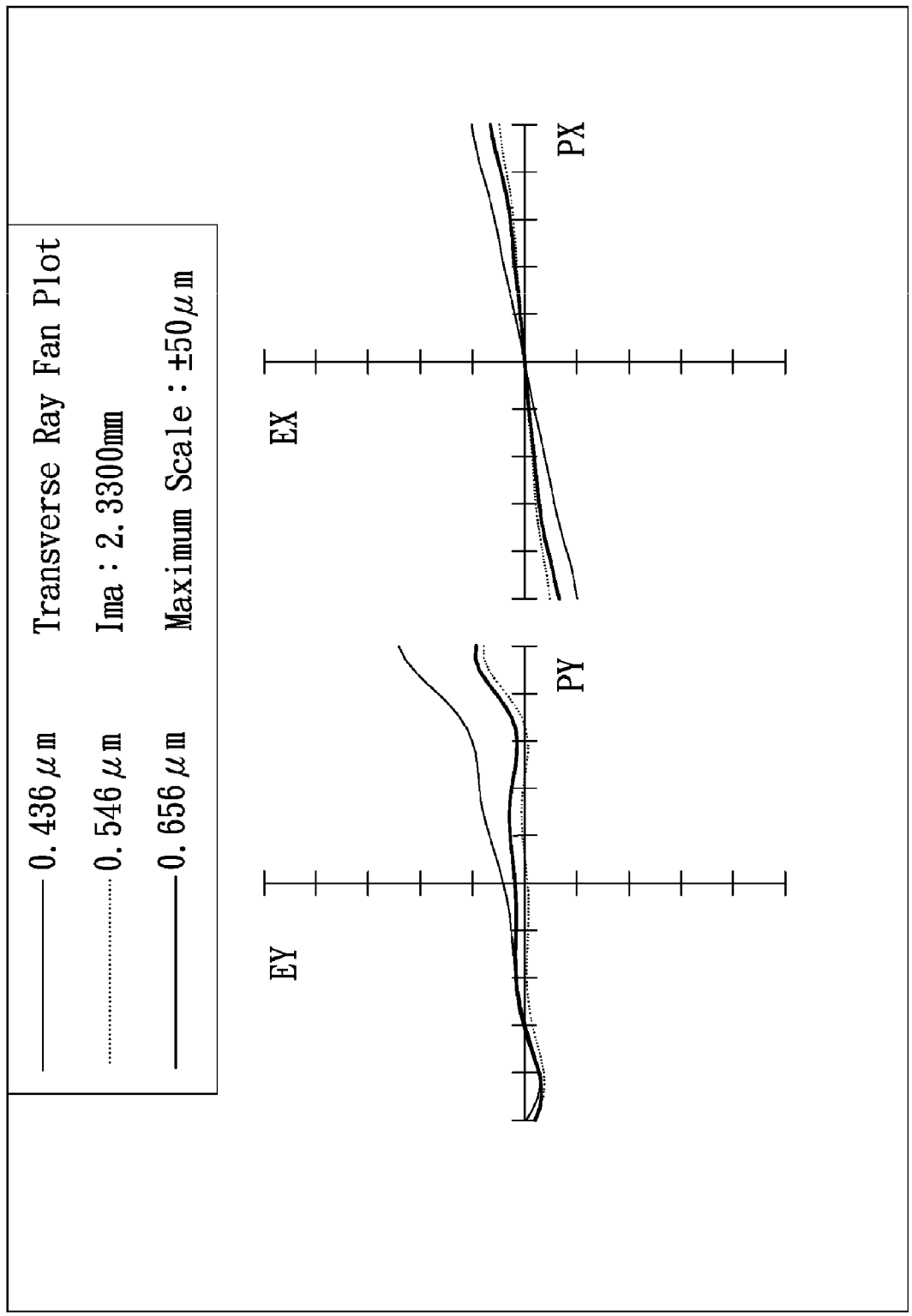
FIG. 5E is a transverse ray fan diagram of a zoom lens at medium end in accordance with an embodiment of the invention.
Figure 5F:
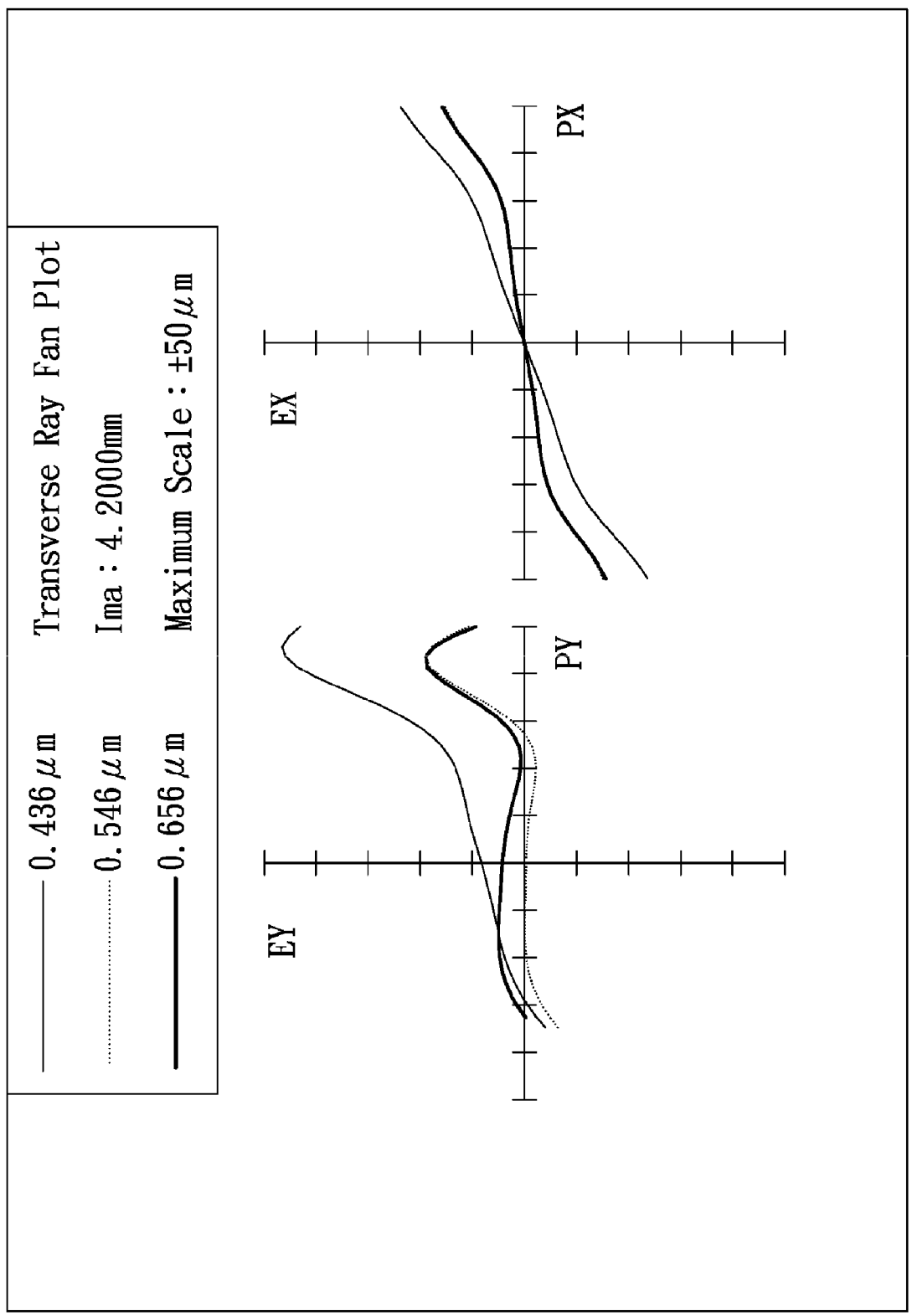
FIG. 5F is a transverse ray fan diagram of a zoom lens at medium end in accordance with an embodiment of the invention.
Figure 5G:
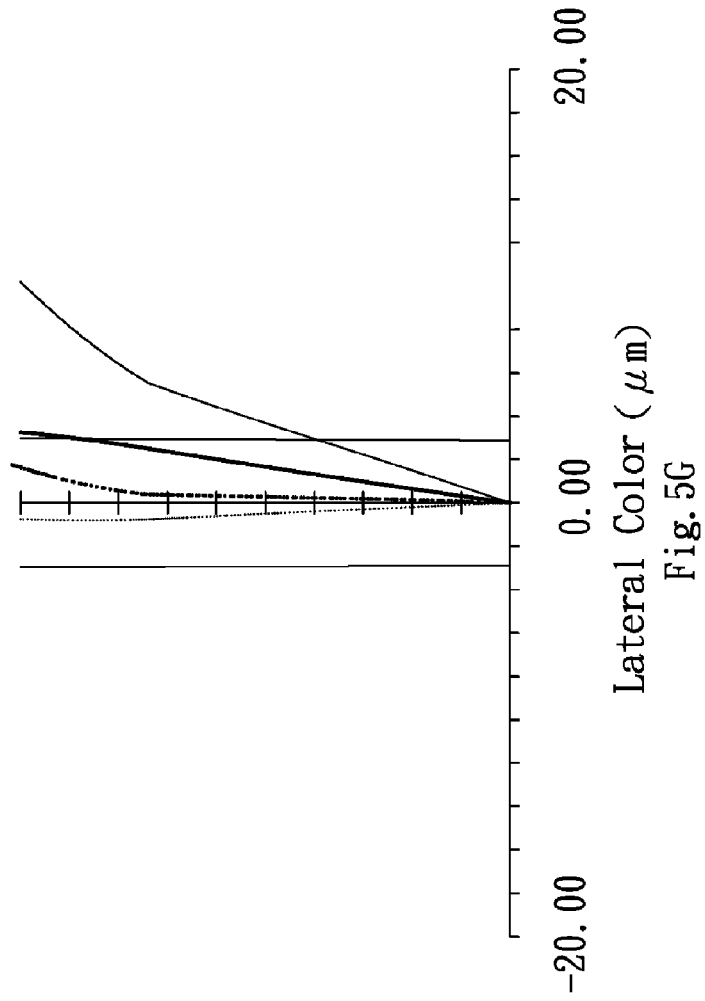
FIG. 5G is a lateral color diagram of a zoom lens at medium end in accordance with an embodiment of the invention.
Figure 6A:
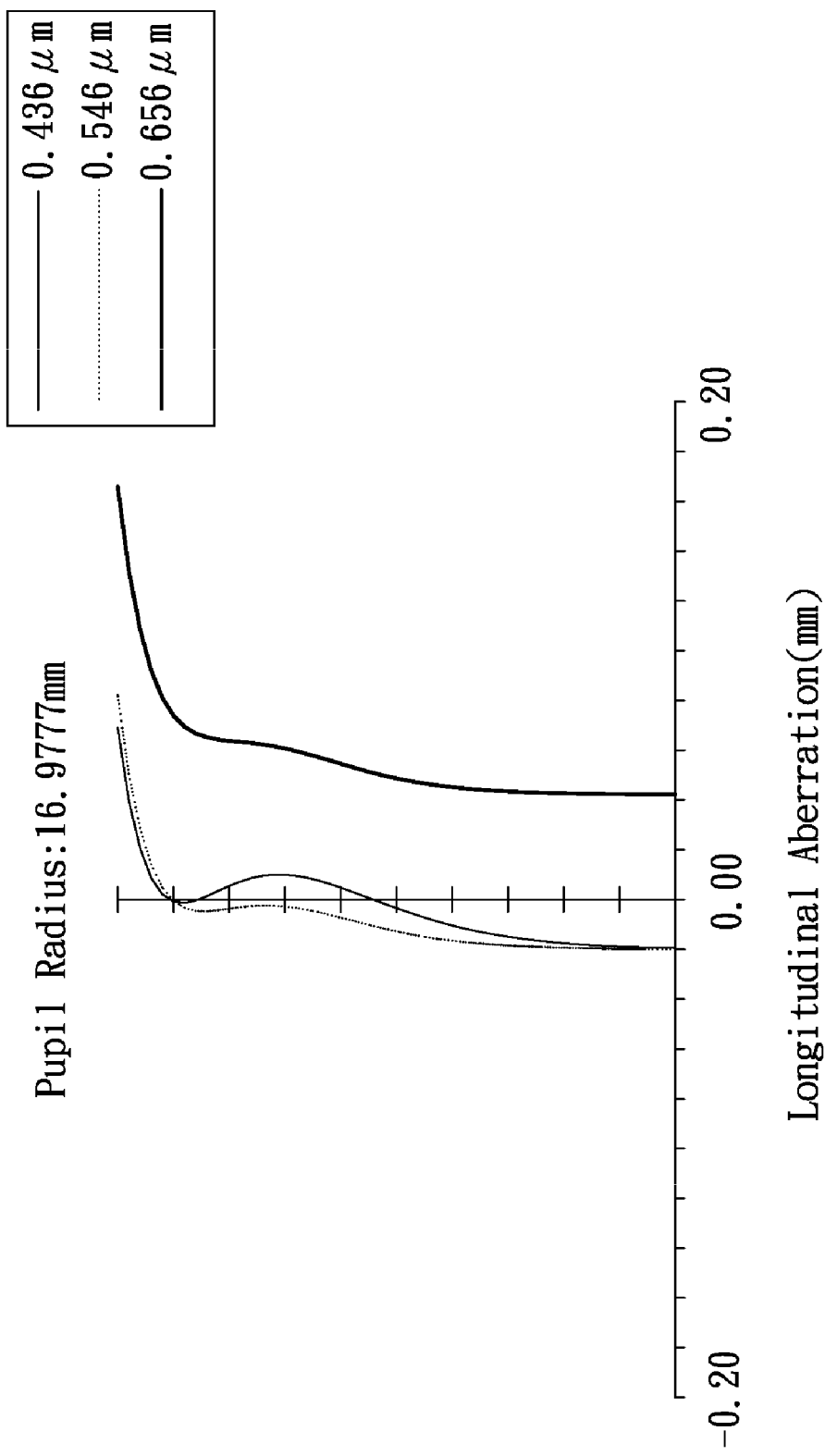
FIG. 6A is a longitudinal aberration diagram of a zoom lens at telephoto end in accordance with an embodiment of the invention.
Figure 6B:
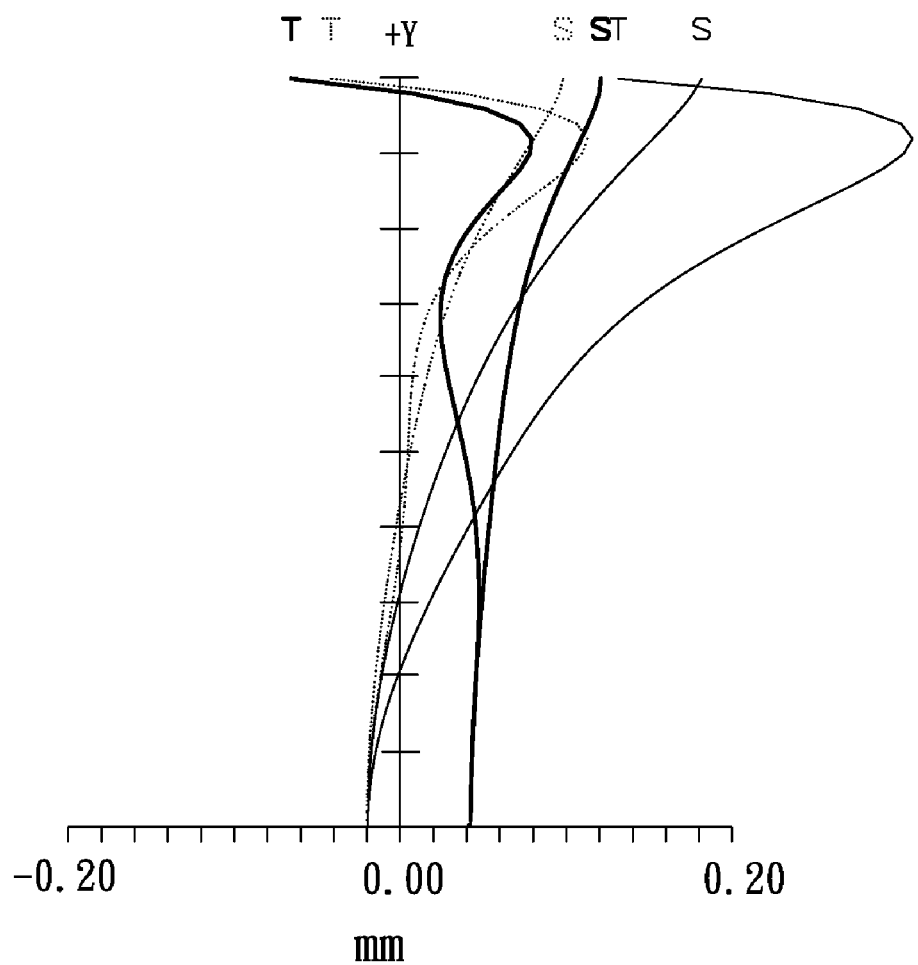
FIG. 6B is a field curvature diagram of a zoom lens at telephoto end in accordance with an embodiment of the invention.
Figure 6C:
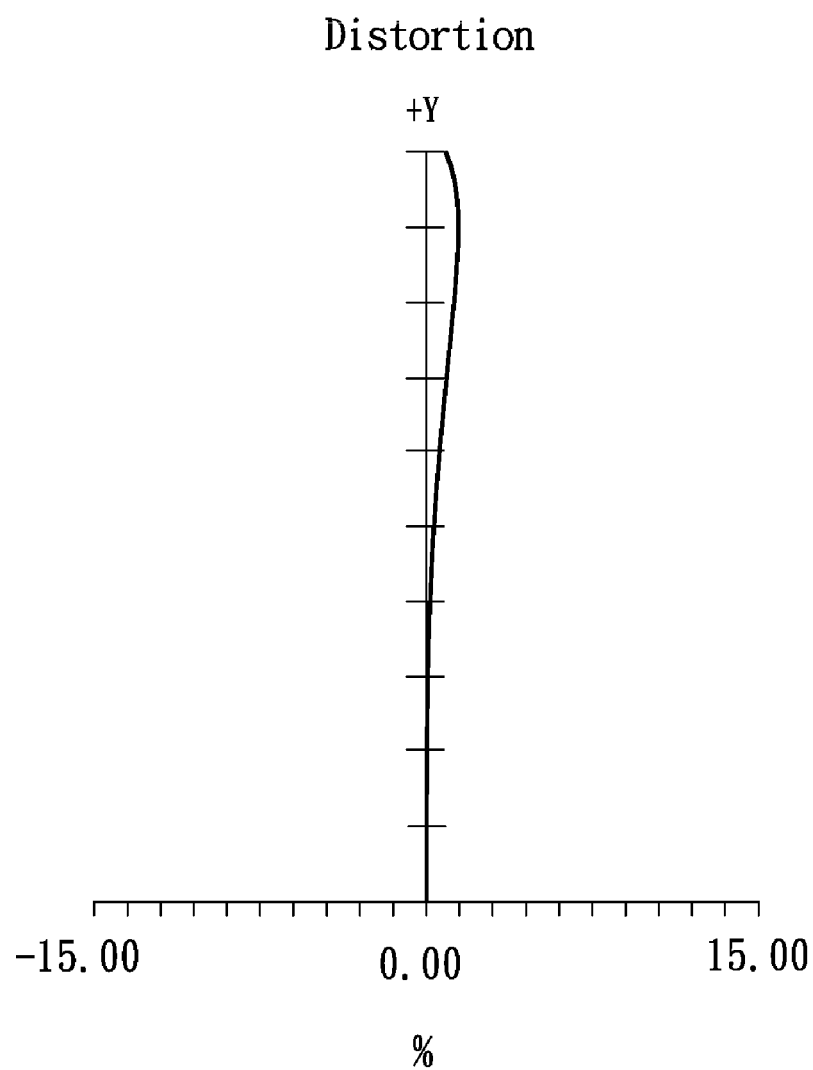
FIG. 6C is a distortion diagram of a zoom lens at telephoto end in accordance with an embodiment of the invention.
Figure 6D:
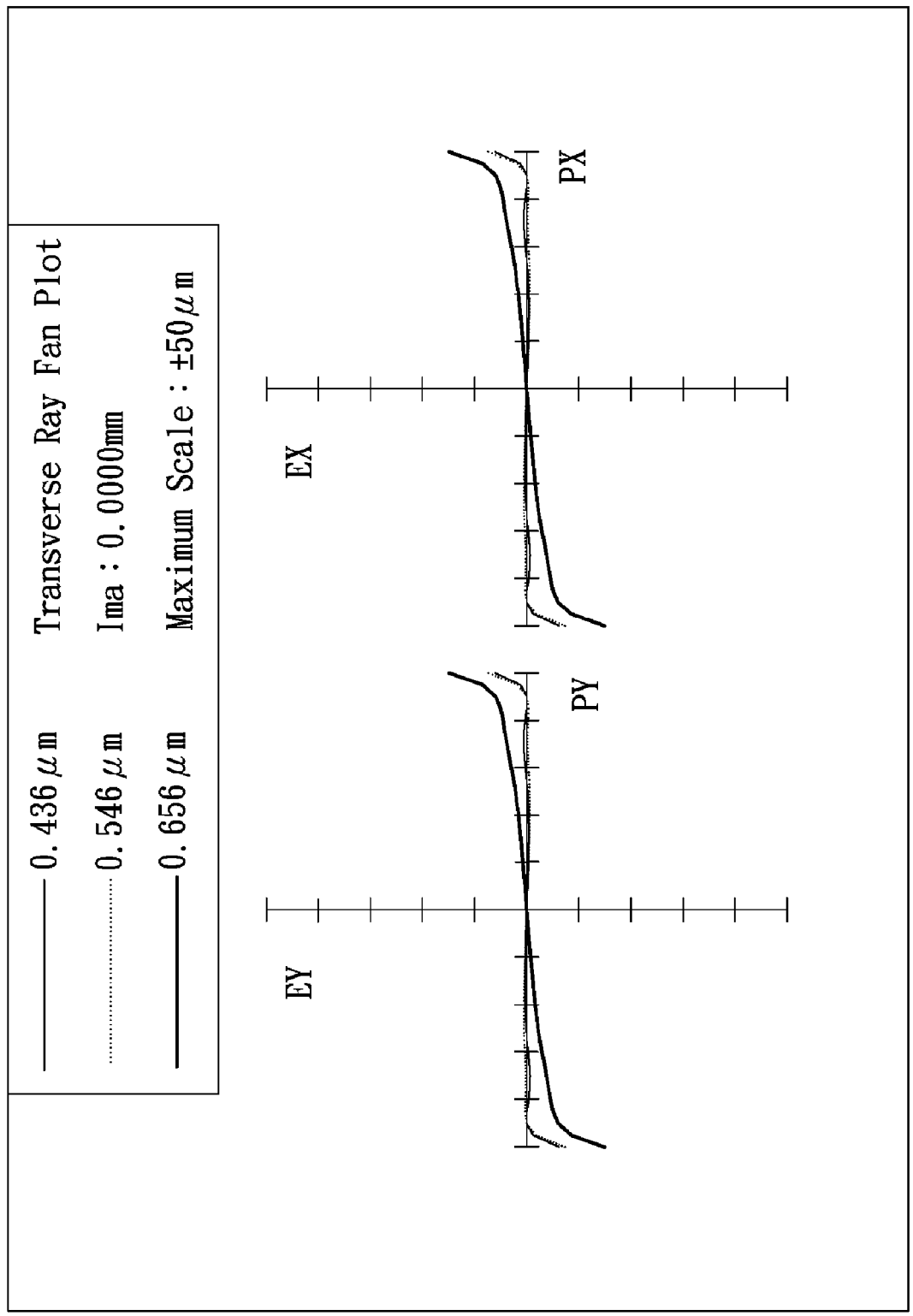
FIG. 6D is a transverse ray fan diagram of a zoom lens at telephoto end in accordance with an embodiment of the invention.
Figure 6E:
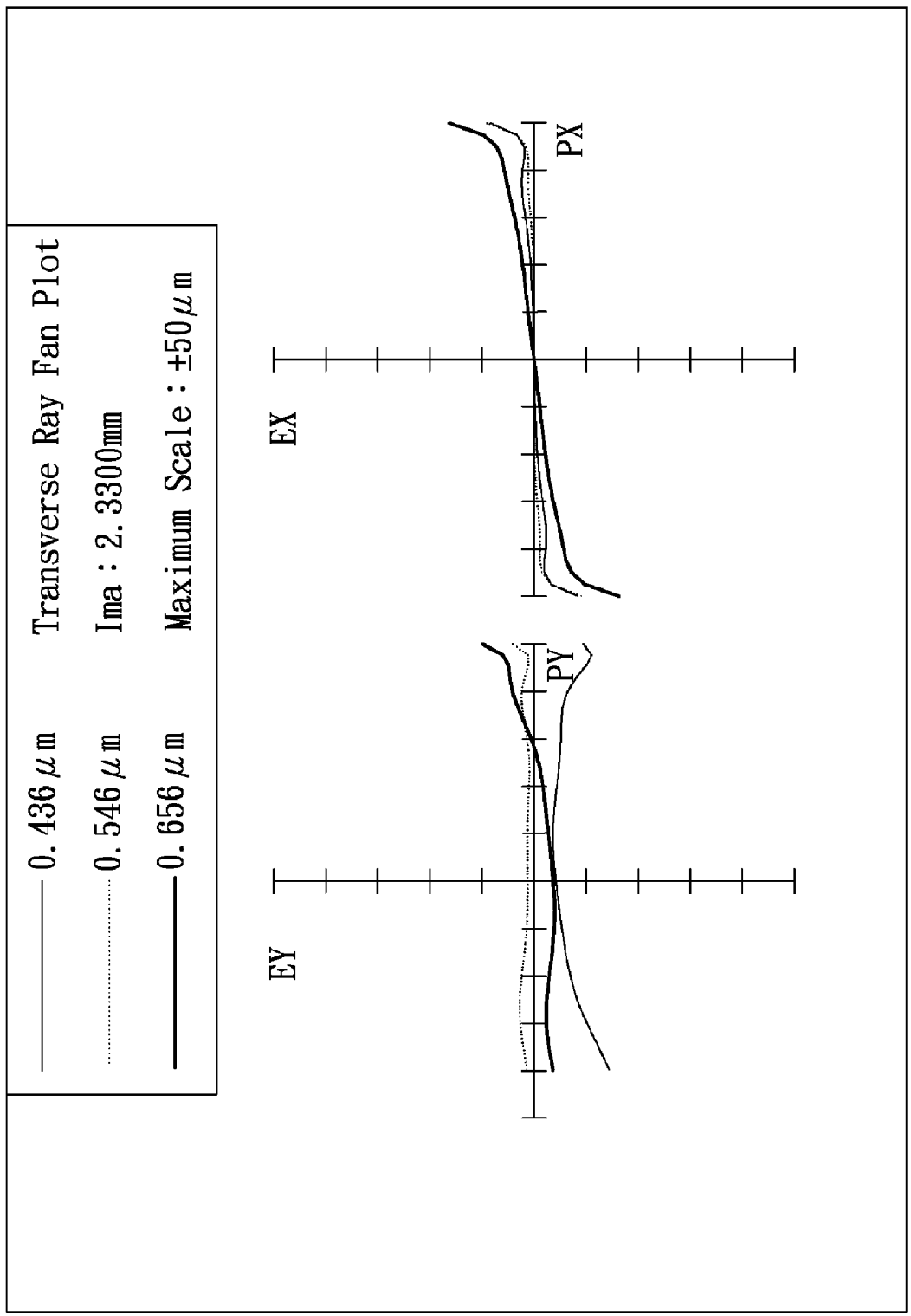
FIG. 6E is a transverse ray fan diagram of a zoom lens at telephoto end in accordance with an embodiment of the invention.
Figure 6F:
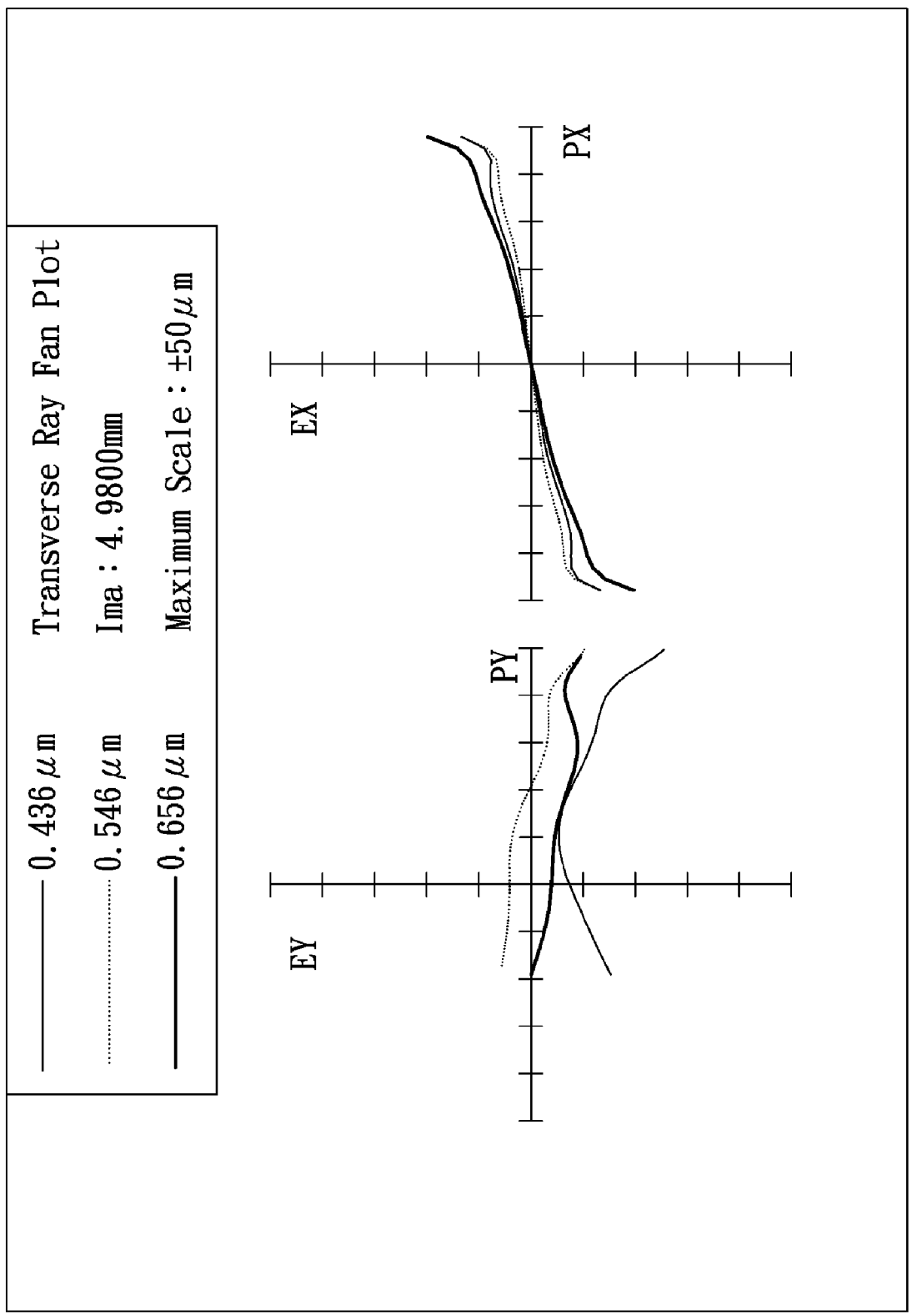
FIG. 6F is a transverse ray fan diagram of a zoom lens at telephoto end in accordance with an embodiment of the invention.
Figure 6G:
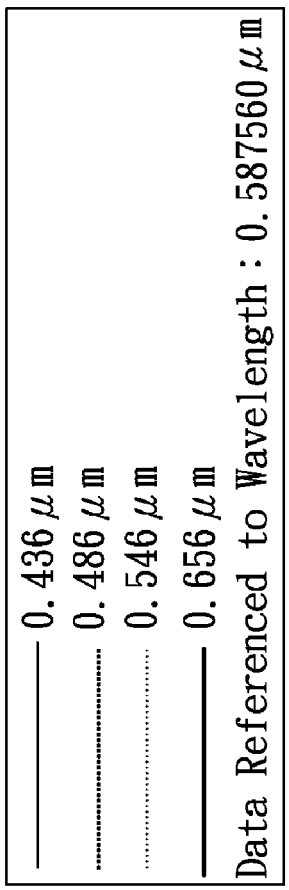
FIG. 6G is a lateral color diagram of a zoom lens at telephoto end in accordance with an embodiment of the invention.
Figure 6G:
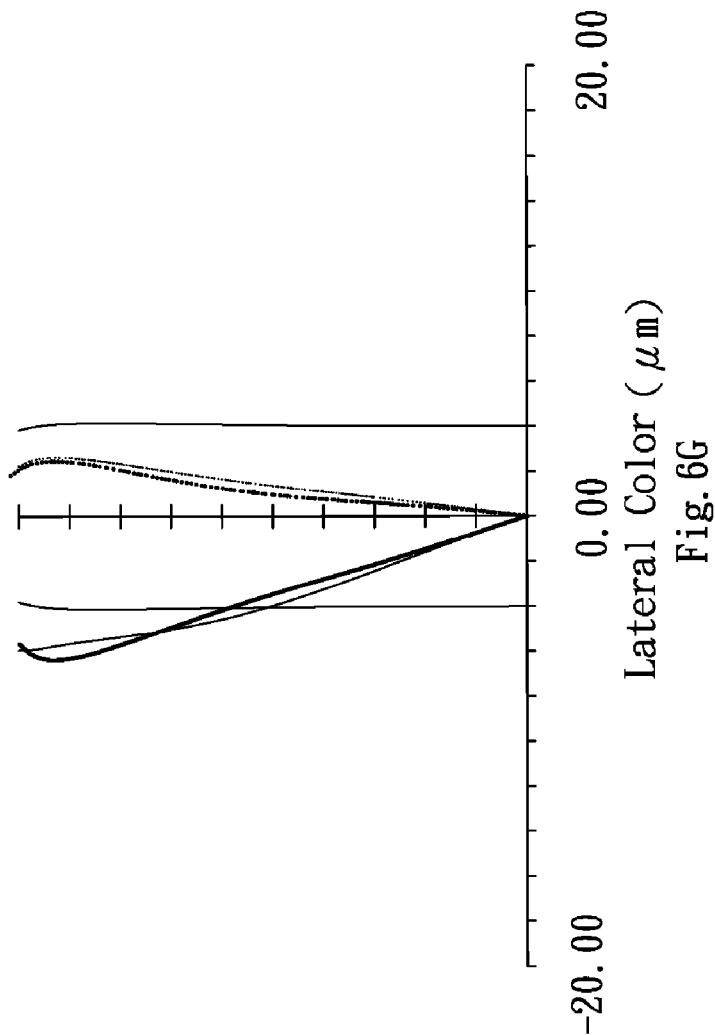

By the above arrangements of the lenses and stop ST, the zoom lens 1 of the present embodiment at the wide-angle end, medium end and telephoto end can meet the requirements of optical performance as seen in FIGS. 4A-4G, FIGS. 5A-5G and FIGS. 6A-6G wherein FIG. 4A, FIG. 5A and FIG. 6A show the longitudinal aberration diagram of the zoom lens 1 of the present embodiment at the wide-angle end, medium end and telephoto end, FIG. 4B, FIG. 5B and FIG. 6B show the field curvature diagram of the zoom lens 1 of the present embodiment at the wide-angle end, medium end and telephoto end, FIG. 4C, FIG. 5C and FIG. 6C show the distortion diagram of the zoom lens 1 of the present embodiment at the wide-angle end, medium end and telephoto end, FIGS. 4D-4F, FIGS. 5D-5F and FIGS. 6D-6F show the transverse ray fan diagram of the zoom lens 1 of the present embodiment at the wide-angle end, medium end and telephoto end, and FIG. 4G, FIG. 5G and FIG. 6G show the lateral color diagram of the zoom lens 1 of the present embodiment at the wide-angle end, medium end and telephoto end.

It can be seen from FIG. 4A that the longitudinal aberration in the zoom lens 1 of the present embodiment at the wide-angle end ranges between −0.08 mm and 0.03 mm for the wavelength range between 0.436 μm and 0.656 μm. It can be seen from FIG. 4B that the field curvature of tangential direction and sagittal direction in the zoom lens 1 of the present embodiment at the wide-angle end ranges between −0.04 mm and 0.08 mm for the wavelength range between 0.436 μm and 0.656 μm. It can be seen from FIG. 4C (the three lines in the figure almost coincide to appear as if a signal line) that the distortion in the zoom lens 1 of the present embodiment at the wide-angle end does not exceed plus or minus 10.0% for the wavelength range between 0.436 μm and 0.656 μm. It can be seen from FIG. 4D, FIG. 4E and FIG. 4F that the transverse ray fan of different image highs in the zoom lens 1 of the present embodiment at the wide-angle end does not exceed plus or minus 34 μm for the wavelength range between 0.436 μm and 0.656 μm. It can be seen from FIG. 4G that the lateral color of different fields with reference wavelength is equal to 0.587560 μm in the zoom lens 1 of the present embodiment at the wide-angle end ranges between −3 μm and 19 μm for the wavelength range between 0.436 μm and 0.656 μm. It is obvious that the longitudinal aberration, the field curvature, the distortion and the lateral color of the zoom lens 1 of the present embodiment at the wide-angle end can be corrected effectively, thereby capable of obtaining good optical performance.

It can be seen from FIG. 5A that the longitudinal aberration in the zoom lens 1 of the present embodiment at the medium end ranges between −0.001 mm and 0.07 mm for the wavelength range between 0.436 μm and 0.656 μm. It can be seen from FIG. 5B that the field curvature of tangential direction and sagittal direction in the zoom lens 1 of the present embodiment at medium end ranges between −0.04 mm and 0.15 mm for the wavelength range between 0.436 μm and 0.656 μm. It can be seen from FIG. 5C (the three lines in the figure almost coincide to appear as if a signal line) that the distortion in the zoom lens 1 of the present embodiment at the medium end does not exceed plus or minus 1.5% for the wavelength range between 0.436 μm and 0.656 μm. It can be seen from FIG. 5D, FIG. 5E and FIG. 5F that the transverse ray fan of different image highs in the zoom lens 1 of the present embodiment at the medium end does not exceed plus or minus 47 μm for the wavelength range between 0.436 μm and 0.656 μm. It can be seen from FIG. 5G that the lateral color of different fields with reference wavelength is equal to 0.587560 μm in the zoom lens 1 of the present embodiment at the medium end ranges between −1 μm and 11 μm for the wavelength range between 0.436 μm and 0.656 μm. It is obvious that the longitudinal aberration, the field curvature, the distortion and the lateral color of the zoom lens 1 of the present embodiment at the medium end can be corrected effectively, thereby capable of obtaining good optical performance.

It can be seen from FIG. 6A that the longitudinal aberration in the zoom lens 1 of the present embodiment at the telephoto end ranges between −0.04 mm and 0.17 mm for the wavelength range between 0.436 μm and 0.656 μm. It can be seen from FIG. 6B that the field curvature of tangential direction and sagittal direction in the zoom lens 1 of the present embodiment at the telephoto end ranges between −0.07 mm and 0.36 mm for the wavelength range between 0.436 μm and 0.656 μm. It can be seen from FIG. 6C (the three lines in the figure almost coincide to appear as if a signal line) that the distortion in the zoom lens 1 of the present embodiment at the telephoto end does not exceed plus or minus 1.5% for the wavelength range between 0.436 μm and 0.656 μm. It can be seen from FIG. 6D, FIG. 6E and FIG. 6F that the transverse ray fan of different image highs in the zoom lens 1 of the present embodiment at the telephoto end does not exceed plus or minus 26 μm for the wavelength range between 0.436 μm and 0.656 μm. It can be seen from FIG. 6G that the lateral color of different fields with reference wavelength is equal to 0.587560 μm in the zoom lens 1 of the present embodiment at the telephoto end ranges between −7 μm and 3 μm for the wavelength range between 0.436 μm and 0.656 μm. It is obvious that the longitudinal aberration, the field curvature, the distortion and the lateral color of the zoom lens 1 of the present embodiment at the telephoto end can be corrected effectively, thereby capable of obtaining good optical performance.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zoom lens comprising a first lens group, a second lens group, a third lens group and a fourth lens group, all of which are arranged in sequence from an object side to an image side along an optical axis, wherein:

the first lens group is with positive refractive power;
the second lens group is with negative refractive power;
the third lens group is with positive refractive power;
the fourth lens group is with positive refractive power;
an interval between the first lens group and the second lens group is changeable, an interval between the second lens group and the third lens group is changeable and an interval between the third lens group and the fourth lens group is changeable when the zoom lens zooms from wide-angle end to telephoto end; and
the first lens group comprising a first lens and a second lens, both of which are arranged in sequence from the object side to the image side along the optical axis, wherein the first lens group and the first lens satisfy the following condition: $-1.2 < f_{G1}/f_1 < -0.58$, wherein $f_{G1}$ is an effective focal length of the first lens group and $f_1$ is an effective focal length of the first lens.

2. The zoom lens as claimed in claim 1, wherein an Abbe number of the first lens is greater than 35.

3. The zoom lens as claimed in claim 2, wherein the first lens is with negative refractive power.

4. The zoom lens as claimed in claim 1, wherein an Abbe number of the second lens is greater than 80.

5. The zoom lens as claimed in claim 4, wherein the second lens is with positive refractive power.

6. The zoom lens as claimed in claim 1, wherein the first lens group further comprising a third lens, all of the first lens, the second lens and the third lens are arranged in sequence from the object side to the image side along the optical axis and an Abbe number of the third lens is greater than 80.

7. The zoom lens as claimed in claim 6, wherein the third lens is with positive refractive power.

8. The zoom lens as claimed in claim 6, wherein the first lens group further comprising a fourth lens, all of the first lens, the second lens, the third lens and the fourth lens are arranged in sequence from the object side to the image side along the optical axis and an Abbe number of the fourth lens is greater than 80.

9. The zoom lens as claimed in claim 8, wherein the fourth lens is with positive refractive power.

10. The zoom lens as claimed in claim 1, further comprising a stop disposed between the second lens group and the third lens group.

* * * * *